United States Patent
Blackwell et al.

(10) Patent No.: US 6,449,654 B1
(45) Date of Patent: Sep. 10, 2002

(54) SYSTEM AND METHODS FOR RETRANSMITTING CORRUPTED DATA

(75) Inventors: Bruce A. Blackwell, Broken Arrow; Franklin E. Boyer, Cleveland; Timothy B. Demers, Tulsa, all of OK (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 09/340,547

(22) Filed: Jun. 28, 1999

Related U.S. Application Data

(63) Continuation of application No. 08/905,452, filed on Aug. 1, 1997, now Pat. No. 6,085,253.

(51) Int. Cl.$^7$ .............................................. G06F 13/00
(52) U.S. Cl. ..................................................... 709/232
(58) Field of Search ................................. 709/200, 203, 709/217, 219, 221, 220, 231, 233, 234, 235, 232

(56) References Cited

U.S. PATENT DOCUMENTS

| | | | |
|---|---|---|---|
| 4,694,490 A | | 9/1987 | Harvey et al. ................. 380/20 |
| 4,965,825 A | | 10/1990 | Harvey et al. ................. 380/9 |
| 5,388,097 A | | 2/1995 | Baugher et al. ............ 370/85.5 |
| 5,440,632 A | * | 8/1995 | Bacon et al. ................. 709/221 |
| 5,452,299 A | | 9/1995 | Thessin et al. ................ 370/62 |
| 5,497,371 A | | 3/1996 | Ellis et al. ...................... 370/60 |
| 5,521,631 A | | 5/1996 | Budow et al. ................... 348/7 |
| 5,550,576 A | | 8/1996 | Klosterman ..................... 348/6 |
| 5,557,541 A | * | 9/1996 | Schulhof et al. ............. 709/219 |
| 5,619,274 A | | 4/1997 | Roop et al. ................... 348/461 |
| 6,101,180 A | * | 8/2000 | Donahue et al. ............. 709/203 |

FOREIGN PATENT DOCUMENTS

| | | | | |
|---|---|---|---|---|
| WO | WO 96/41471 | | 12/1996 | .......... H04N/7/088 |
| WO | 0 753 817 A1 | | 1/1997 | ........... G06F/13/12 |

* cited by examiner

Primary Examiner—Robert B. Harrell
(74) Attorney, Agent, or Firm—Fish & Neave; Richard M. Feustel, Jr.

(57) ABSTRACT

The present invention provides a system and method for transmitting and receiving data that can transmit data over a plurality of data paths simultaneously and that provides a plurality of transmission queues which enable data transmissions to be continuously prioritized and which do not cause bottlenecking of data. In the preferred embodiments, the present invention comprises a data transmission facility, at least one forward data path, at least one data reception facility, and at least one reverse data path. Data is transmitted in response to a request to transmit data which may be locally generated at the data transmission facility, or may be remotely generated at any of the data reception facilities and transmitted to the data transmission facility through the reverse data path. The requested data is then transmitted from the data transmission facility through at least one forward data path to at least one data reception facility. Data is transmitted in the form of at least one header packet and at least one data packet for each data file. In the event that errors are detected in this transmission of data, retransmissions of the corrupted data may then be requested by any of the data reception facilities through the reverse data path. The transmitted data is finally received by at least one data reception facility, where a copy of the requested data file is recovered and the data is used as desired.

12 Claims, 9 Drawing Sheets

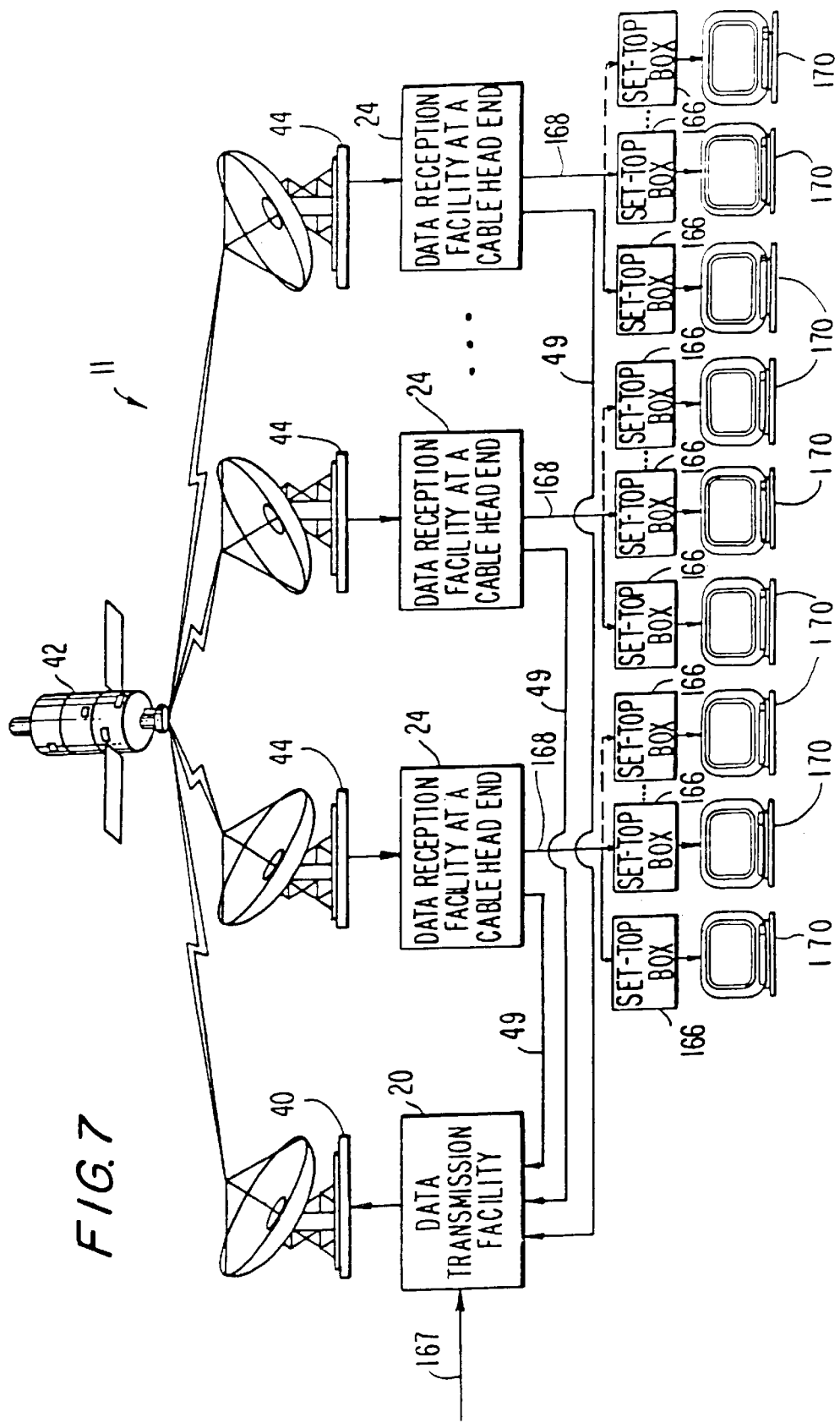

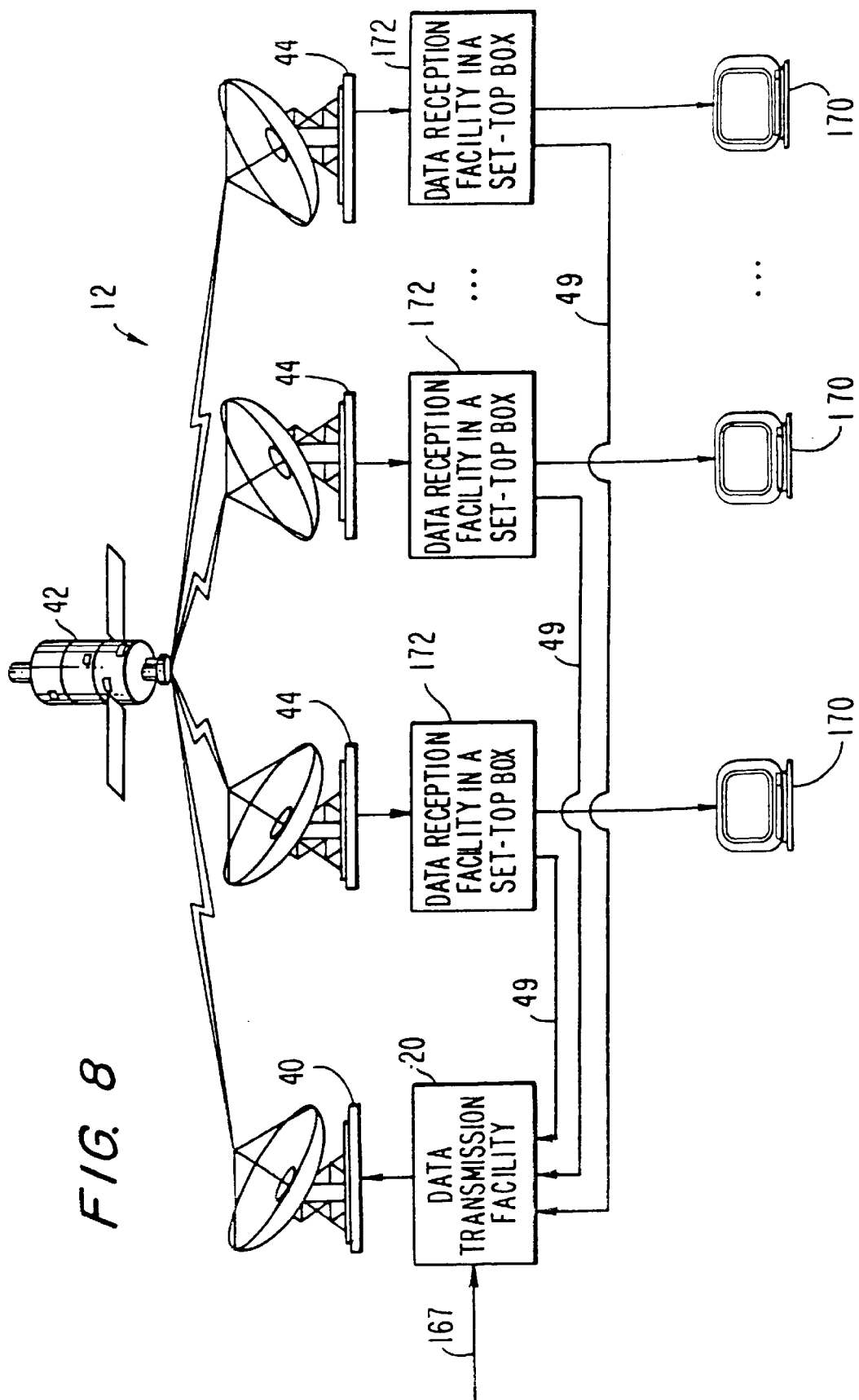

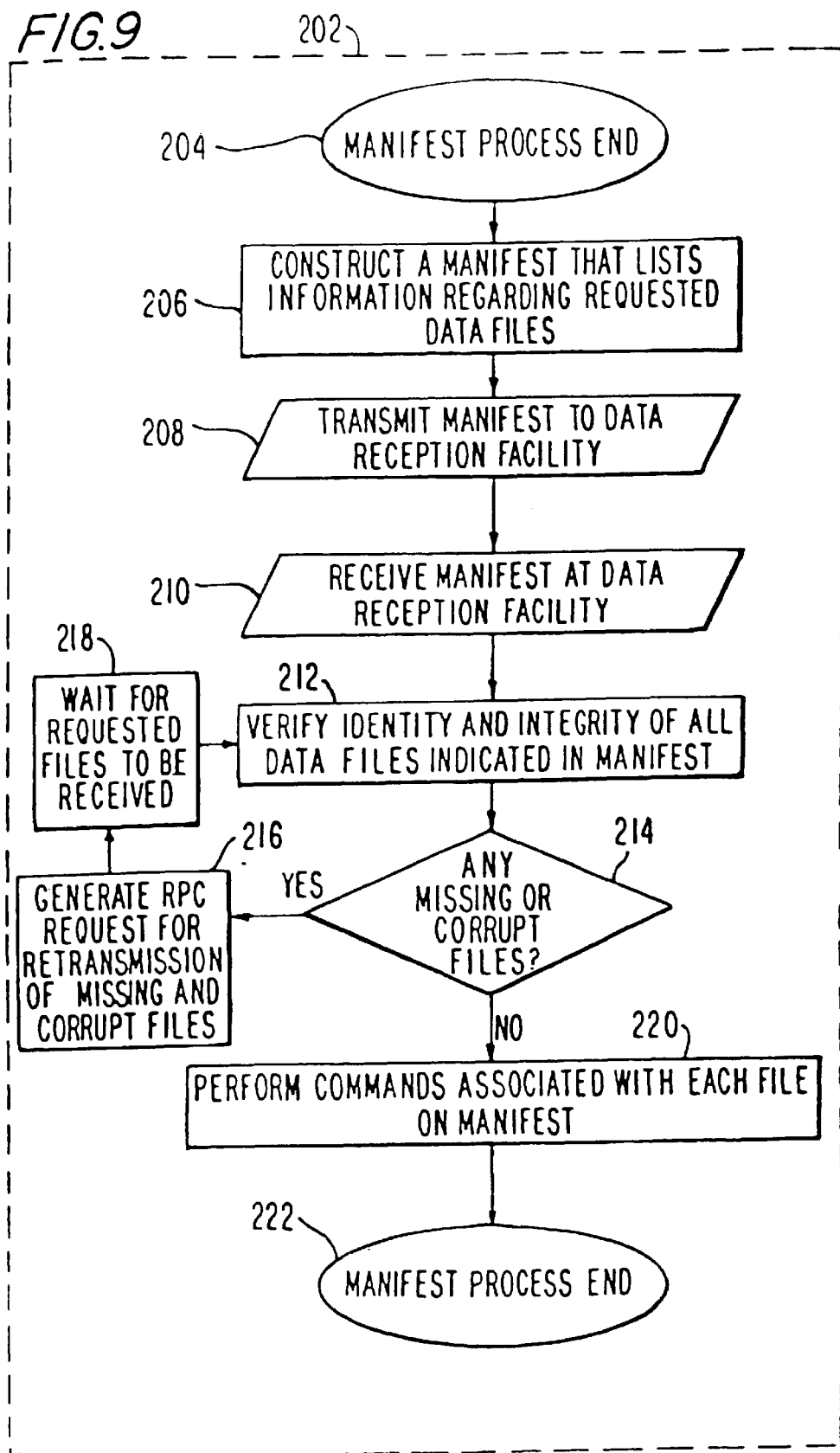

SYSTEM AND METHODS FOR RETRANSMITTING CORRUPTED DATA

This is a continuation of application Ser. No. 08/905,452, filed Aug. 1, 1997, now U.S. Pat. No. 6,085,253.

BACKGROUND OF THE INVENTION

The present invention relates generally to systems and methods for transmitting and receiving data. More particularly, the present invention relates to systems and methods for transmitting and receiving data that allow data transmissions to be prioritized, that allow dynamic grouping of data recipients, that allow the size of data packets to be varied from file to file, and that provide a manifest process to insure the presence, identity, and integrity of transmitted data files.

Some systems and methods for transmitting and receiving data permit the transmission of data to be prioritized. In many of these systems and methods, however, the data transmissions must all be prioritized before any data transmission can begin in order to insure that transmission priorities are maintained. For example, under these systems and methods, once a data transmission has begun for a low priority data file, a data transmission for a high priority data file must wait for the low priority transmission to complete before the high priority transmission can begin. In many cases this approach to prioritization results in bottlenecking of data where very large, low priority data files that are being transmitted prevent the transmission of many small, high priority data files. Similarly, bottlenecking can also occur in instances where many large, high priority data files prevent a small, low priority file from being transmitted in a timely fashion.

Frequently it is desirable to send a single data transmission from a transmitter to multiple recipients. Some systems and methods for transmitting data allow such transmissions to be performed to predetermined groups of individuals. Some of these and other systems and methods for transmitting data allow recipients to receive data for groups in which the recipients are interested. None of these systems and methods, however, allows a transmitter to dynamically specify the recipients for a single transmission at the time of the transmission.

Many systems and methods for transmitting data use packet based transmission to transmit data from one place to another. These forms of packet based transmission, however, are rigid in that they fix the size of every packet regardless of the data file type, the data file size, or the characteristics of the path over which the data is to be transmitted. Thus, in many of these systems and methods, the same packet size may be used to transmit a 100 byte file as is used to transmit a 100 Mega-byte file, for example. Using the same size packet regardless of the size of the file to be transmitted is inefficient because the percentage of the file in each packet shrinks rapidly as the size of the transmitted file grows.

Finally, in many systems and methods for transmitting data, groups of data files are transmitted from one place to another as bundles of data files. Unfortunately, however, once these files arrive at their destination, the batch of files must be presumed to include all of the intended files because no additional indicator is provided as to what files should be present. Additionally, each of the transmitted files is usually only identifiable by the name, date, and time associated with the file. Lastly, in order to process the received files properly, the receiving system must know what to do with the files after they have arrived.

In view of the foregoing, it would be desirable to provide a system and method for transmitting and receiving data in which data being transmitted can be prioritized while not causing bottlenecking of the data.

It would also be desirable to provide a system and method for transmitting and receiving data in which multiple recipients of data can be dynamically specified just prior to a group data transmission.

It would be further desirable to provide a system and method for transmitting and receiving data in which the size of packets used in the transmission of data can be varied from file to file.

It would be even further desirable to provide a system and method for transmitting and receiving data which can verify the presence, identity, and integrity of each data file in a bundle of transmitted data files.

SUMMARY OF THE INVENTION

It is therefore an object of this invention to provide a system and method for transmitting and receiving data in which data being transmitted can be prioritized while not causing bottlenecking of the data.

It is another object of this invention to provide a system and method for transmitting and receiving data in which multiple recipients of data can be dynamically specified just prior to a group data transmission.

It is a further object of this invention to provide a system and method for transmitting and receiving data in which the size of packets used in the transmission of data can be varied from file to file.

It is a further object of this invention to provide a system and method for transmitting and receiving data which can verify the presence, identity, and integrity of each data file in a bundle of transmitted data files.

These and other objects of the present invention are achieved by providing a system and method for transmitting and receiving data that allow data transmissions to be prioritized, that allow dynamic grouping of data recipients, that allow the size of data packets to be varied from file to file, and that provide a manifest process to insure the presence, identity, and integrity of transmitted data files.

In illustrative embodiments of the present invention, the data transmission and reception capabilities of the system and method are provided by a data transmission facility, at least one forward data path, at least one data reception facility, and at least one reverse data path. Generally speaking, data is transmitted in this system and method in response to a request to transmit data. This request may be locally generated at the data transmission facility, or may be remotely generated at any of the data reception facilities and transmitted to the data transmission facility through the reverse data path. Once a request has been received, the requested data is then prepared and transmitted from the data transmission facility through at least one forward data path to at least one data reception facility. In the event that errors are detected in this transmission of data, retransmissions of the corrupted data may then be requested by any of the data reception facilities through the reverse data path. The transmitted data is finally received by at least one data reception facility, where a copy of the requested data file is recovered and the data is used as desired.

Data may be transmitted in the form of at least one header packet and at least one data packet for each data file. The one or more header packets each include information to identify the associated data file, to identify the one or more target data reception facilities, to identify and describe the associated data packets, to indicate the data file transmission priority, and to indicate the integrity of each header packet and data file. Each data packet transmitted in association with a data file includes an associated header packet identifier, a unique data packet identifier, a data packet size indicator, at least a portion of the data from the data file, and a code to check the integrity of the data in the data packet.

Prior to transmission, each of these header and data packets is constructed and queued at the data transmission facility. In response to a remote procedure call (RPC) request that is received at the data transmission facility, an RPC server constructs a new file header packet for new transmission requests or retrieves an existing file header packet from storage for retransmission requests. This file header packet is then transferred to one of a number of data transmission queues based upon the size of the requested file and the priority indicated in the RPC request. Once the header packet has been transferred to a data transmission queue, the RPC server waits for and processes other RPC requests. After receiving this file header packet, each data transmission queue notifies a scheduler that the queue has a data file that is waiting to be transmitted.

Whenever any of the queues contains data waiting to be transmitted, the scheduler continuously selects the next queue from which a packet is to be transmitted and the forward data path on which that queue is to do so. In selecting this next queue, the scheduler preferably attempts to maintain, based upon the priority of each queue, a fixed ratio of the number of packet transmissions for each queue as compared to the total number of packets transmitted in all of the queues. For example, in a data transmission facility with five queues that have priorities of "1," "2," "3," "4," and "5," wherein priority "1" is the highest priority and priority "5" is the lowest priority, the scheduler may attempt to maintain the number of packet transmissions at sixteen, eight, four, two, and one for each of the five queues, respectively, for every thirty one total packets transmitted from all of the queues combined. In selecting the forward data path on which each queue is to transmit a header or data packet, the scheduler preferably attempts to direct each queue to the fastest available forward data path that is not being used when each queue is given permission to transmit.

Once permission and a forward data path selection have been received from the scheduler at a data transmission queue, the data transmission queue retrieves and transmits on the selected forward data path, the next header or data packet that is to be transmitted. After transmitting a header or data packet, the data transmission queue once again waits for a new permission indication and a forward data path selection until all of the data packets for a data file have been transmitted. Upon all of the data packets being transmitted, the data transmission queue then notifies the scheduler that no file is waiting to be transmitted so that the scheduler will not attempt to give the queue permission to transmit data. The queue then copies, if necessary, the file header packet to storage so that the queue will be able to satisfy any future retransmission requests and then removes the file header packet from the queue. Once the file header packet has been removed from the queue, the queue waits for other file header packets to be received from the RPC server.

BRIEF DESCRIPTION OF THE DRAWINGS

The above and other objects and advantages of the present invention will be apparent upon consideration of the following detailed description, taken in conjunction with the accompanying drawings, in which like reference numerals refer to like parts throughout, and in which:

FIG. 7 is a block diagram of an illustrative cable television data distribution system in accordance with the present invention; and FIG. 8 is a block diagram of an illustrative direct broadcast data distribution system in accordance with the present invention.

FIG. 9 is a flow diagram representing a manifest process.

DETAILED DESCRIPTION OF THE INVENTION

Figure 1:
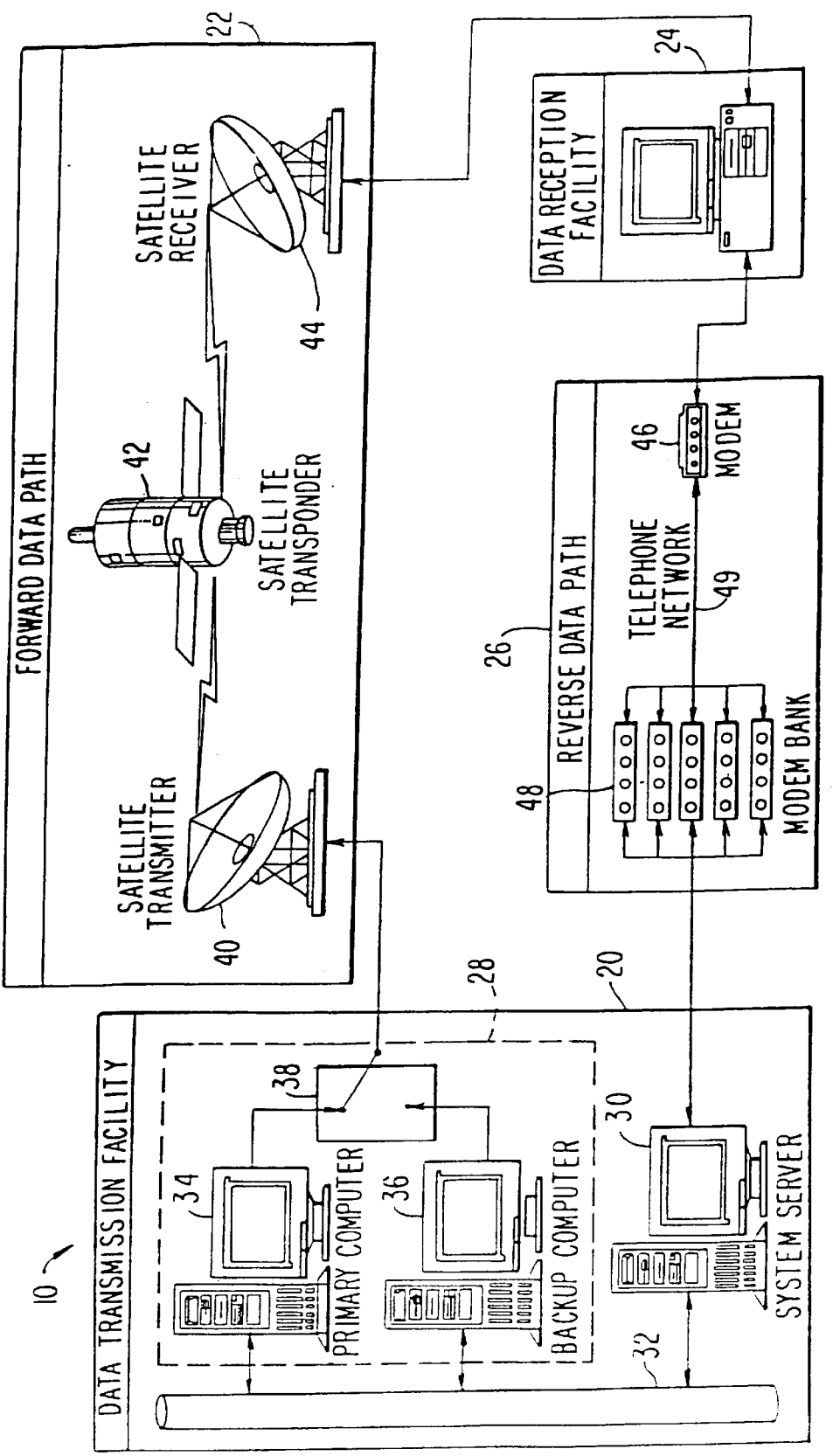
FIG. 1 is a block diagram of an illustrative data transmission and reception system in accordance with the present invention.

A system 10 for transmitting and receiving data in accordance with the present invention is shown in FIG. 1. System 10 has a data transmission facility 20, at least one forward data path 22, at least one data reception facility 24, and at least one reverse data path 26. Data transmission in system 10 is initiated by the generation of a remote procedure call (RPC) request at data transmission facility 20, at one or more data reception facilities 24, or at another facility connected to data transmission facility 20. Any RPC requests generated at a data reception facility 24 are transmitted to data transmission facility 20 through one of the reverse data paths 26. Data transmission facility 20 responds to the RPC request by retrieving the requested data, generating at least one header packet, generating at least one data packet, queuing the header and data packets, and transmitting the packets when appropriate. Prior to generating or transmitting the header and data packets, data transmission facility 20 may perform compression, forward error correction, encryption, and/or any other suitable data processing on the data of the header and data packets.

The packets are transmitted from data transmission facility 20 to at least one data reception facility 24 through at least one forward data path 22. All of the packets transmitted from data transmission facility 20 are monitored by the data reception facilities 24 and only those packets that are addressed to an individual data reception facility 24 are then received by that individual data reception facility 24. One the transmitted packets have been received by a data reception facility 24, the packets are then checked for transmission errors, and reconstructed into a copy of the requested data file. Prior to or after either checking for errors or reconstructing the data file, data reception facility 24 may also perform decompression, error detection and correction, and decryption on the data in the received header and data packets.

In the event that any data reception facility 24 detects an error in a transmitted packet, a retransmission request may be generated at that data reception facility 24 for any or all of the transmitted packets and conveyed to data transmission facility 20 through a reverse data path 26. Preferably, retransmission requests are delayed at each data reception facility 24 by a random period of time in order to cause requests for the same packet from different data reception facilities 24 to be skewed in time. By delaying the retransmission requests in this way, the first retransmission of a replacement packet will cause subsequent, pending retransmission requests to be canceled at the data reception facilities 24 that have not yet issued the associated retransmission request. Alternatively, to coordinate and prioritize retransmission requests, all such requests may be synchronized to be transmitted at the same time from all of the data reception facilities 24. For example, a retransmission request for a priority "3" data packet may be purposefully delayed until a predetermined time of day (e.g., 3:00 am) or delayed for a fixed period of time (e.g., 6 hours). This allows retransmission requests from multiple data reception facilities 24 to be received substantially simultaneously, thereby preventing duplicative retransmissions of header or data packets.

Data transmission facility 20 preferably includes a transmission system 28, a system server 30, and a data network 32. Transmission system 28 controls the transmission of data from data transmission facility 20. Functions performed by transmission system 28 may included storage of data transmitted in system 10, generation of RPC requests, processing of RPC requests, generation of header and data packets for the requested data, queuing of the header and data packets, scheduling of packet transmissions, and transmission of header and data packets. Although these functions may be effectively implemented on a single, multi-tasking computer running an operating system such as Windows NT or Unix, these functions may also be distributed across more than one platform and coordinated using communication protocols between the individual functions. For example, rather than storing data in transmission system 28, data may be stored in a dedicated data server that receives instructions from transmission system 28 and provides the requested data on demand.

Transmission system 28 includes a primary computer 34, a backup computer 36, and a switch 38. Primary computer 34 and backup computer 36 are preferably identical machines running similar software, so that if primary computer 34 fails, backup computer 36 can seamlessly maintain the functions of transmission system 28. Accordingly, both primary computer 34 and backup computer 36 preferably have hardware and/or software that enables each to perform the above-mentioned functions of transmission system 28. To most effectively provide its backup function, backup computer 36 preferably receives and processes all of the data and RPC requests that are transmitted to primary computer 34. To enable backup computer 36 to connect to each forward data path 22, switch 38 is provided between primary computer 34, backup computer 36, and each forward data path 22. Preferably switch 38 is an intelligent switch that is capable of automatically detecting a failure in primary computer 34 and switching the connection between each forward data path 22 and primary computer 34 to a connection between each forward data path 22 and backup computer 36, although a manual, operator-actuated switch, or any other suitable switch may also be used.

System server 20 provides a data request mechanism through which at least one data reception facility 24 can request original transmissions of data or retransmissions of corrupted, previously transmitted header and data packets. These requests may be generated at data reception facility 24 and conveyed to system server 30 through reverse data path 26. System server 30 preferably comprises hardware and/or software that enables it to maintain bidirectional data communications with a plurality of data reception facilities 24 simultaneously.

To communicate transmission and retransmission requests received at system server 30 to transmission system 28, system server 30 is connected to primary computer 34 and backup computer 36 through data network 32. Although data network 32 is illustrated in FIG. 1 as being connected to only primary computer 34, backup computer 36, and system server 30, it should be understood that data network 32 may be connected to other computers, servers, network equipment, networks, and any other suitable devices. This arrangement allows additional sources of data and RPC requests for transmission system 28 to be connected to data network 32. Data network 32 is preferably an Ethernet network. If desired, data network 32 may be implemented using satellite, telephone, computer network, Internet, radio frequency, and optical based communication systems, or any other suitable communication system, or any suitable combination of these communication systems.

As stated above, data is transmitted in system 10 from data transmission facility 20 to data reception facility 24 through at least one forward data path 22. As illustrated, each forward data path 22 uses at least a portion of one satellite transmitter 40, at least a portion of one satellite transponder 42, and at least a portion of one satellite receiver 44. System 10 preferably has multiple parallel forward data paths 22. In such an implementation, the multiple forward data paths 22 may use one or more satellite transmitters 40, one or more satellite transponders 42, and one or more satellite receivers 44. To maximize the effective data rate available in the sum of all of the parallel forward data paths 22, each forward data path 22 is preferably operated at the highest data rate available. Although a forward data path 22 is illustrated in FIG. 1 as being implemented using satellite based communications, any forward data path 22 could similarly be implemented using telephone, computer network, Internet, radio frequency, and optical based communication systems, or any other suitable communication system, or any suitable combination of these communication systems.

Data reception facility 24 can be any device capable of receiving data transmissions from data transmission facility 20 in the form of a header packet followed by at least one data packet. Once these packets are received, data reception facility 24 must be capable of storing these packets and reconstructing a copy the original data file. Preferably, data reception facility will also be capable of requesting transmissions of new data and detecting errors in previously transmitted header and data packets and requesting retransmissions of those packets. Data reception facility 24 may also perform decompression, error detection and correction, and decryption on the data in the header and data packets received from data transmission facility 20. As illustrated, data reception facility 24 may be a computer such as a personal computer, or may also be a television set-top box, a television, video cassette recorder or any other device capable of receiving, manipulating, and storing data.

Reverse data path 26 as illustrated comprises at least one modem 46 (which is preferably located near the data reception facility 24), at least one telephone network 49, and at least one modem bank 48 (which is preferably located near the data transmission facility 20). Reverse data path 26 provides a path through which RPC requests for transmissions of new data and retransmissions of corrupted, previously transmitted data can be conveyed from data reception facility 24 to data transmission facility 20. Reverse data path 26 could also be used to send diagnostic, configuration, reboot, and emergency data between data transmission facility 20 and data reception facility 24. Additionally, reverse data path 26 can be used to transmit data from data transmission facility 20 to data reception facility 24. For example, a data reception facility 24 may request a retransmission of a header packet from data transmission facility 20. Because header packets are relatively small and may be easily transmitted over reverse data path 26, this path is preferably used to satisfy retransmission of header packet requests rather than using a forward data path 22. Likewise, as another example, data requests for very time sensitive data may be satisfied using reverse data path 26 in addition to or rather than queuing the data through any forward data path 22.

Although reverse data path 26 is illustrated in FIG. 1 as being implemented using telephone based communications, reverse data path 26 could similarly be implemented using satellite, computer network, Internet, radio frequency, and optical based data communication systems, or any other suitable data communication system, or any suitable combination of data communication systems. In addition, forward data paths 22 and reverse data paths 26 could be combined into at least one bidirectional data path.

Reverse data paths 26 are optional whenever the inability to generate RPC requests for new data transmissions and replacement data transmissions from an associated data reception facility 24 can be tolerated. In a system 10 with no reverse data paths 26, system server 30 is not required.

Figure 2:
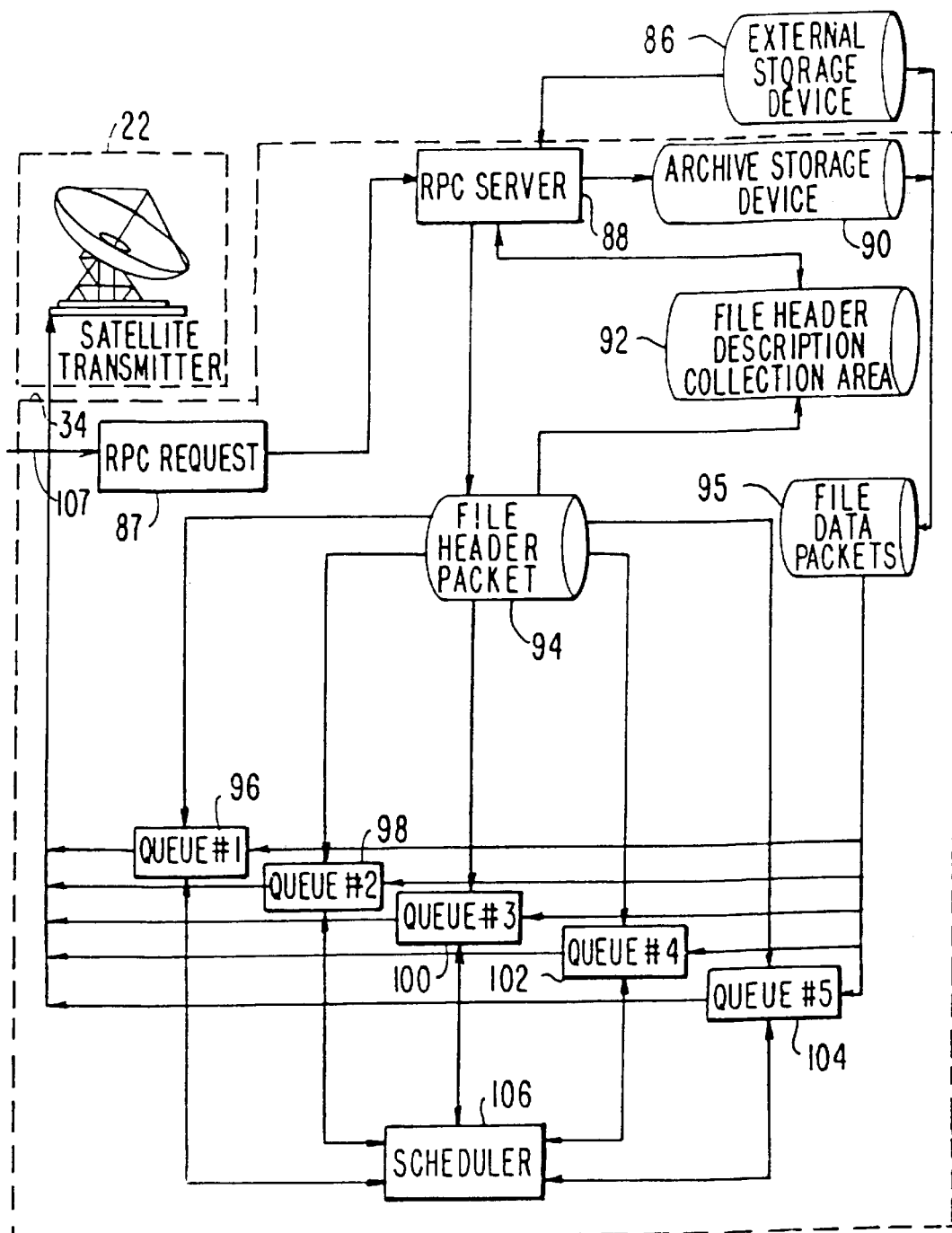
FIG. 2 is a data flow diagram representing the flow of data in a transmission system computer in accordance with the present invention.

An illustrative data flow arrangement for the data in primary computer 34 of transmission system 28 (FIG. 1) is shown in FIG. 2. RPC requests 87 for new data transmissions and replacement data transmissions are processed by RPC server 88. These RPC requests 87 may be generated within primary computer 34 or transmitted to primary computer 34 through RPC request input 107. For new data transmission requests, RPC server 88 first determines if a copy flag is set in RPC request 87. If the copy flag is set, the requested data file is copied from an external storage device 86 into an archive storage device 90. Archive storage device 90 typically stores a data file for a fixed period of time such as a week, month, or other suitable duration of time, although other mechanisms for determining how long a data file should be archived in archive storage device 90 may similarly be implemented with the present invention.

Once the data file has been copied, a file header packet 94 for the data file is constructed (or is retrieved from a file header description collection area 92 if previously constructed). File header packet 94 preferably includes a synchronization pattern, a packet type identifier, data flags, a data reception facility machine address, a data reception facility group address, an indication of the number of data packets for the associated data file, an indication of the size of each data packet, a data file identification number, a priority identifier, a name of the source of the data file, file attributes, a file date and time, a file name, and two 32 bit cyclic redundancy check (CRC) codes. These pieces of information are included in file header packet 94 to assist data reception facility 24 (FIG. 1) in receiving and reconstructing the transmitted data file.

More particularly, the synchronization pattern is used to identify the beginning of the header packet and to verify that all of the data bits in the used forward transmission path 22 (FIG. 1) are operating properly. In an illustrative embodiment of the present invention, the synchronization pattern is the hexadecimal number 55AA. The packet type identifier may be used to indicate to the data reception facility 24 (FIG. 1) the type, version, and other characteristics of the received packet. For example, a packet type identifier of "1" may indicate a first version of a header packet 94, a packet type identifier of "2" may indicated a first version of a data packet 95, a packet type identifier of "3" may indicate a second version of a header packet 94, and a packet type identifier of "4" may indicate a second version of a data packet 95. The data flags are used in header packet 94 to indicate whether the associated data file can be resent (if necessary) and whether the data file is to be archived in transmission system 28 (FIG. 1).

The data reception facility machine address and the data reception facility group address are used to identify which data reception facilities 24 (FIG. 1) are supposed to receive the data being transmitted. Each data reception facility 24 (FIG. 1) has a unique data facility machine address. If the data reception facility machine address in header packet 94 has a non-zero value, this address indicates which data reception facility 24 (FIG. 1) is to receive header packet 94 and the associated data packets 95. In order to transmit data to more than one data reception facility 24 (FIG. 1), group addresses may be used to designate a predetermined group of data reception facilities 24 (FIG. 1). For example, a data reception facility group address of "1" may be used for all data reception facilities 24 (FIG. 1) in a central region of the United States. When a group address is designated in a header packet, the machine address is preferably zero to avoid any ambiguity that the header packet 94 and the associated data packets 95 are destined for data reception facilities 24 (FIG. 1) corresponding to that group address.

To allow groups of data reception facilities 24 (FIG. 1) to be grouped dynamically, the present invention allows multiple copies of a header packet 94 to be generated for each data file. Each copy of header packet 94 is identical except for the data reception facility machine address. This machine address in each copy of header packet 94 is used to identify one member of the dynamic group. By then transmitting one header packet 94 to each member of the dynamic group, each member will then recognize that the associated data packets 95 as being targeted for that particular data reception facility 24 (FIG. 1).

In order to convey to each data reception facility 24 (FIG. 1) receiving data packets 95 how large the final data file is going to be, header packet 94 indicates the number of data packets 95 for the associated data file and the size of each data packet 95. For example, for a 1024 byte data file, header packet 94 may indicate that eleven data packets 95 having one hundred bytes of file data each are going to be sent to a data reception facility 24 (FIG. 1). In this example, a packet size indicator in the last data packet 95 would indicate that the data packet contains only twenty four bytes of file data (and seventy six bytes of filler data) rather than the one hundred bytes of file data as contained in the previous ten data packets 95. Because the maximum size of each data packet 95 is indicated through header packet 94, data reception facilities 24 (FIG. 1) can set up data buffers into which the received data packets 95 can be efficiently stored. The size of data packets 95 may be based on factors such as the optimal transmission buffer size for a forward data path 22 (FIG. 1), the size of the data file, whether compression or forward error correction is being applied to the data packets, and any other suitable factors. For example, a forward data path 22 (FIG. 1) may achieve optimal transmission speeds when transmitting eight kilo-byte buffers of data. In such a case, the data packets would preferably be eight kilo-bytes each to take advantage of this characteristic of the forward data path 22 (FIG. 1). Although the size of the data packets is fixed for each data packet corresponding to a data file by the size designated in the associated header packet, the size of the data packets may be varied from data file to data file by simply changing the data packet size designated in each header packet.

The data file identification number is a 32-bit number that is sequentially assigned by data transmission facility 20 (FIG. 1) to each data file transmitted in system 10 (FIG. 1). This number is then included in each data packet 95 transmitted in association with a header packet 94. Because 4,294,967,296 data files must be transmitted from data transmission facility 20 (FIG. 1) before the data file identification number will roll over, a particular data file identification number is essentially an unambiguous identifier that data packets 95 being transmitted with that number are associated with the corresponding header packet 94.

The priority identifier included in the header packet 94 indicates what priority is associated with a data file for which a header packet 94 was generated. This priority may indicate how urgently the data file should be transmitted to a data reception facility 24 (FIG. 1) and roughly how large the data file is. For example, in preferred embodiments of the present invention, data files with a priority of "1" have the highest priority. These files should be transmitted before and/or at a higher data rate than a file with priorities of "2" or lower. To prevent system 10 (FIG. 1) from becoming bottlenecked by extremely large files with high priorities, limits may be placed on the maximum size of each file with a given priority. For example, priority "1" may be limited to data files under 1 kilo-byte in size, whereas priority "3" may only be limited to files not exceeding 100 kilo-bytes.

The two 32-bit CRC codes included in header packet 94 are used to verify the integrity of header packet 94 and the data file reconstructed from data packets 95 associated with header packet 94. Using a cyclic redundancy check process, data corruption that may have occurred during the construction of header packet 94, parsing of the original data file, during header packet 94 or data packet 95 transmission, or during data file reconstruction, can be detected. In the event that an error is detected based on either of these 32-bit CRC codes, the target data reception facility 24 (FIG. 1) can request that a new header packet 94, a new data packet 95, or a whole new data file be transmitted.

Once header packet 94 has been constructed by RPC server 88, header packet 94 is placed in an appropriate queue 96, 98, 100, 102, or 104 by RPC server 88. Preferably, each queue 96, 98, 100, 102, and 104 is a first-in-first-out (FIFO) queue and therefore each packet entered into the queue is placed at the last position in the queue output order. Alternatively, however, queues 96, 98, 100, 102, and 104 could permit RPC server 88 to select the position in the queue in which a header packet 94 or a data packet 95 is placed in order to achieve another level of priority within each queue.

As illustrated, primary computer 34 comprises five queues 96, 98, 100, 102, and 104 which have priorities, as described above, of "1," "2," "3," "4," and "5," respectively. For queues 96, 98, 100, 102, and 104, the data output rates are preferably sixteen, eight, four, two, and one header packets 94 and/or data packets 95 for each thirty one header packets 94 and/or data packets 95 output from all of the queues 96, 98, 100, 102, and 104 combined. These rates only apply in cases in which all five queues 96, 98, 100, 102, and 104 have data waiting to be output. For example, if all of queues 96, 98, 100, and 102 with priority levels of "1," "2," "3," and "4," respectively, are empty, data in queue 104 with a priority level of "5" would be output without interruption.

Although in the illustrative embodiment of the invention, primary computer 34 is implemented with five queues 96, 98, 100, 102, and 104, each having a unique priority value and each priority value corresponding to a fixed output data rate, other numbers of queues could be implemented with some, none, or all having the same priority value and some, none, or all of the priority values corresponding to a fixed output data rate. For example, the present invention could be implemented using three queues, one of which has a "high" priority value and the others of which have a "low" priority value. In this example, the data could be output from the queues so that all of the data in the "high" priority queue is output before any data from either of the "low" priority queues is output.

After header packet 94 is loaded into the appropriate queue 96, 98, 100, 102, or 104, the queue notifies a scheduler 106 that the queue has a data file that is waiting to be transmitted. Scheduler 106 controls the transmission of header packets 94 and data packets 95 from queues 96, 98, 100, 102, and 104. Scheduler 106 preferably ensures that the packet output rate for each of queues 96, 98, 100, 102, and 104 corresponds to the priority assigned to each. Scheduler 106 also assigns the output of each queue 96, 98, 100, 102, and 104 to an available forward data path 22 and makes sure that no two queues 96, 98, 100, 102, or 104 attempt to transmit through the same forward data path 22 simultaneously. This is achieved by requiring that queues 96, 98, 100, 102, and 104 all receive permission from scheduler 106 before any of queues 96, 98, 100, 102, or 104 can transmit. Once permission has been given to a queue by scheduler 106, the scheduler checks to see which queues still have data to be transmitted and then selects the next queue to transmit.

When a queue 96, 98, 100, 102, or 104 receives permission to transmit from scheduler 106, the queue retrieves the next packet to be transmitted and then transmits the packet on the selected forward data path 22 (FIG. 1). The first packet transmitted for each data file is always a header packet 94. Additional header packets 94 may also be transmitted immediately following the first packet whenever dynamic groups of data reception facilities 24 (FIG. 1) are used. Furthermore, in implementations of system 10 (FIG. 1) in which any queue 96, 98, 100, 102, or 104 is going to simultaneously transmit data packets 95 for the same data file over two or more forward data paths 22 (FIG. 1), a copy of each header packet 94 for that data file is preferably transmitted over each of the forward data paths 22 (FIG. 1) to be used. By transmitting each header packet 94 over each of the forward data paths 22 (FIG. 1) to be used, backup copies of header packets 95 are provided to each target data reception facility 24 (FIG. 1) and the possibility that a data packet 95 will be received at a data reception facility 24 (FIG. 1) prior to the associated header packet 94 is eliminated.

Once each header packet 94 for a data file has been transmitted, the associated queue 96, 98, 100, 102, or 104 then processes the data packets 95 for the data file. In doing so, the queue 96, 98, 100, 102, or 104 first retrieves the data for each data packet 95 from archive storage collection 90 or external storage 86, as necessary, and constructs a data packet 95.

By providing queues 96, 98, 100, 102, and 104 with different transmission priorities, and by scheduling transmissions from these queues so as to maintain a fixed output ratio between the queues, the problem of bottlenecking is solved. For example, large, low priority transmissions will not block small high priority transmissions because the high priority transmissions will be transmitted through a different queue than the low priority transmissions. As another example, large, high priority transmissions will not completely block small, low priority transmissions because maintaining a fixed output ratio between the queues insures that data is continuously being output from all of the queues.

Each data packet 95 preferably includes a synchronization pattern, a packet type identifier, a data file identification number, a data packet number, an indication of the number of bytes of data in the packet, the packet's data, and a 32-bit CRC code. Similarly to that in header packet 94, the synchronization packet in each data packet 95 is used to synchronize the reception of the data packet 95 and verify that all of the bits in the used forward data path 22 are functioning. The packet type identifier may be used to indicate to the data reception facility 24 (FIG. 1) the type, version, and other characteristics of the received packet. For example, a packet type identifier of "1" may indicate a first version of a header packet 94, a packet type identifier of "2" may indicated a first version of a data packet 95, a packet type identifier of "3" may indicate a second version of a header packet 94, and a packet type identifier of "4" may indicate a second version of a data packet 95.

As described in connection with the description of header packet 94, the data file identification number is used to associate all data packets 95 for a data file with the corresponding one or more header packets 94. The data packet number is used to indicate what number each data packet 95 is in a series of many data packets 95 for a given data file. For example, the first data packet 95 of a series of one hundred data packets 95 for a data file may have a data packet number of one and the last data packet 95 of the series may have a data packet number of one hundred. By monitoring the sequence of data packet numbers, a data reception facility 24 (FIG. 1) can determine if a data packet 95 has been lost during transmission from a jump in the data packet numbers of two consecutively received data packets 95.

As described above, the number of bytes of data in each data packet 95 is indicated so that data packets 95 that are not full can be identified by each target data reception facility 24 (FIG. 1). The packet's data comprises at least a portion of the data from the original data file that will be used to reconstruct the data file at each target data reception facility 24 (FIG. 1).

The 32-bit CRC code is provided to detect errors in each data packet 95. By providing a CRC code for each data packet 95, a targeted data reception facility 24 (FIG. 1) can identify individual corrupted data packets 95 from a data file and request retransmission of only the corrupted data packets 95 rather than having to request retransmission of the whole data file.

After a data packet 95 has been constructed, the queue, once again, waits for permission to transmit and direction as to on which forward data path 22 (FIG. 1) to do so, to be received from scheduler 106. After permission has been received, queue 96, 98, 100, 102, or 104 then transmits the data packet 95 on the selected forward data path 22 (FIG. 1). This data packet 95 processing repeats in the queue 96, 98, 100, 102, or 104 until all data packets 95 for a data file have been transmitted. Once all of the data packets 95 have been transmitted, the queue 96, 98, 100, 102, and 104 notifies scheduler 106 that no more data is waiting to be transmitted in the queue. Finally, each header packet 94 is removed from queue 96, 98, 100, 102 or 104 from which the packet was transmitted. Whenever a header packet 94 has a resend flag set in the data flags of header packet 94, header packet 94 is copied to a file header description collection area 92 prior to removal from queue 96, 98, 100, 102 or 104.

Preferably, each queue 96, 98, 100, 102, and 104 processes only one data file at a time and therefore does not accept new header packets 94 from RPC server 88 prior to transmitting the last data packet 95 for a data file. Alternatively, however, each queue 96, 98, 100, 102, and 104 could receive other header packets 94 in between retrieving and constructing data packets, and thereby interlace multiple data file header packets 94 and data packets 95 in the same queue 96, 98, 100, 102, and 104.

Figure 3:
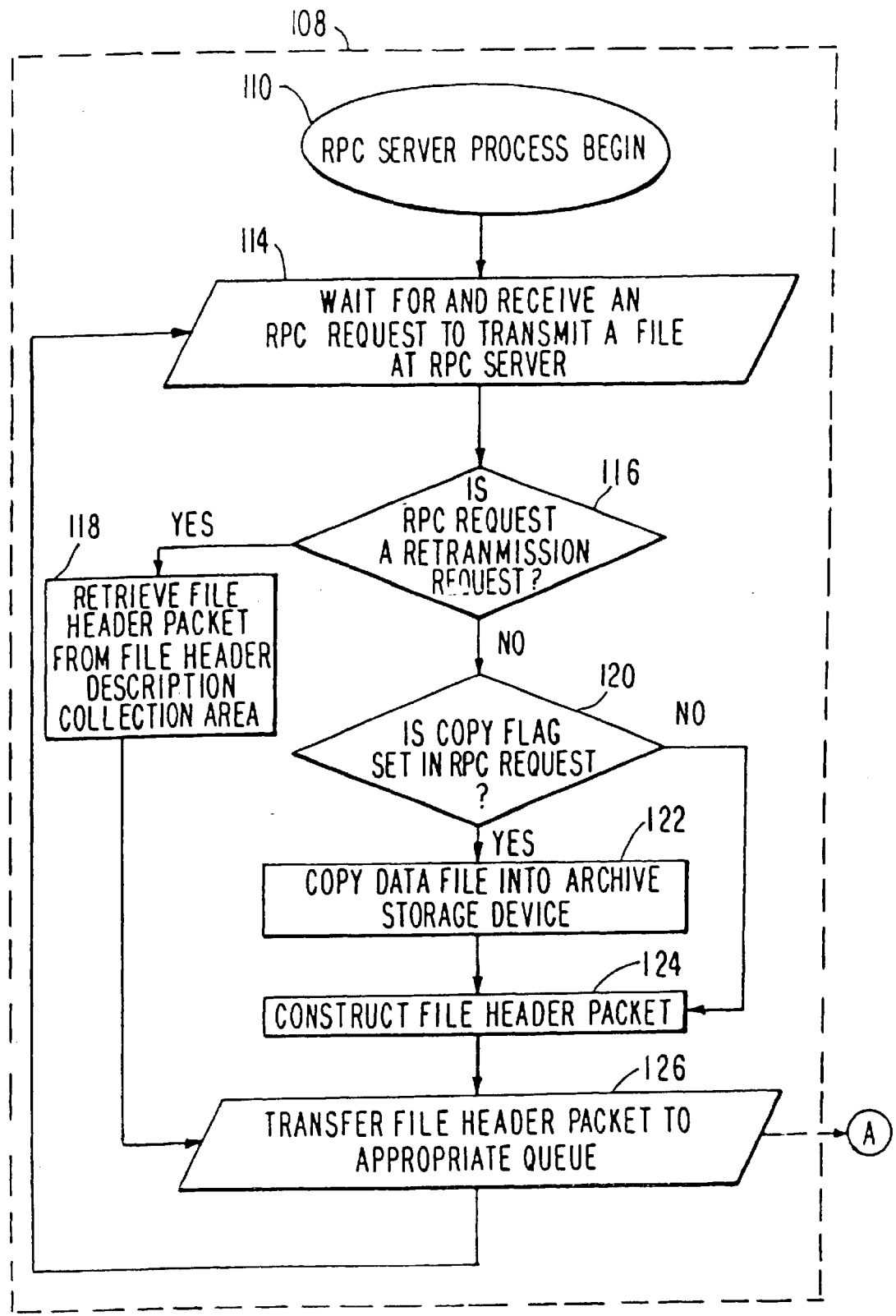
FIG. 3 is a flow diagram representing the RPC handler processing function of a transmission system computer in accordance with the present invention.
Figure 4:
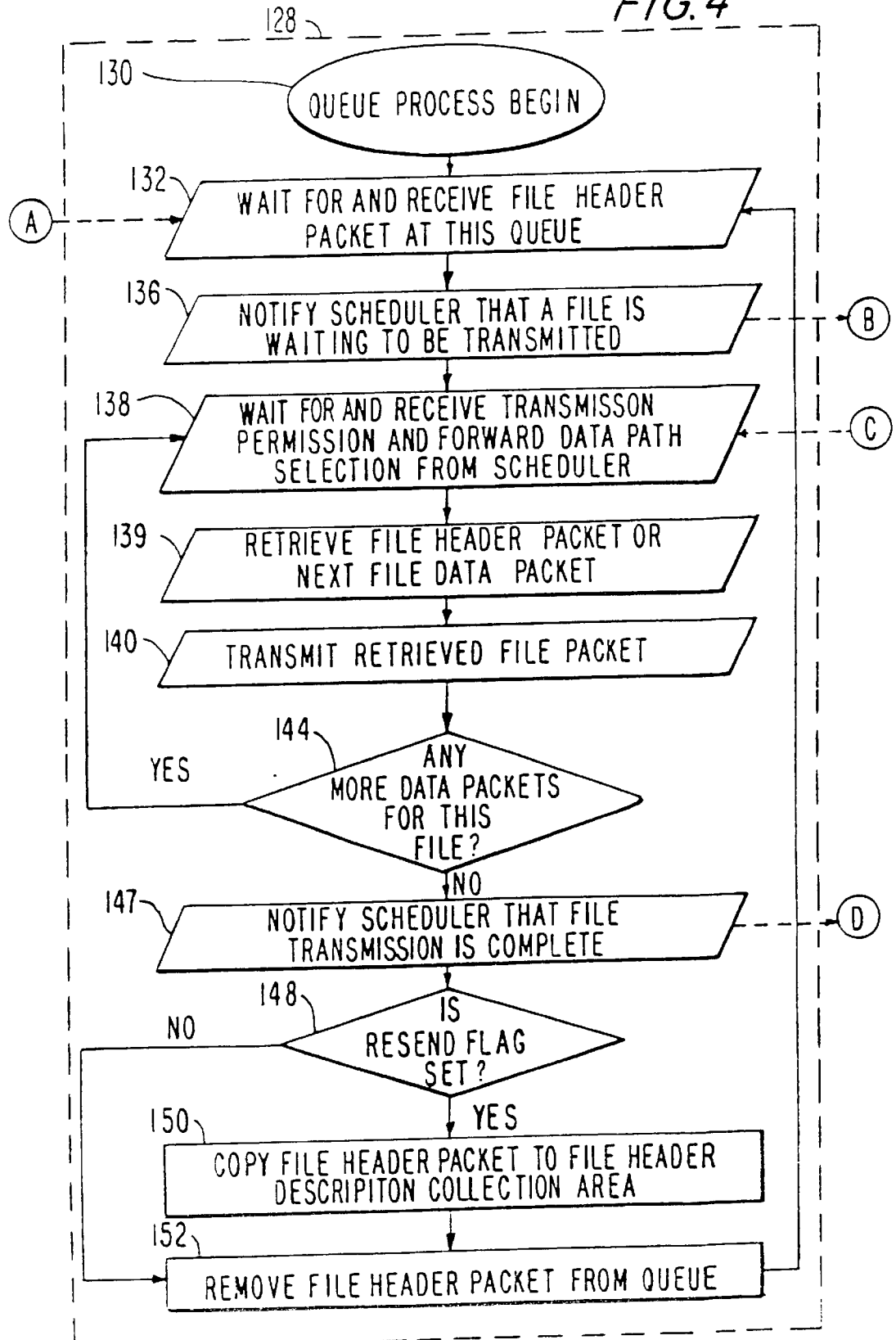
FIG. 4 is a flow diagram representing the queue processing function of a transmission system computer in accordance with the present invention.
Figure 5:
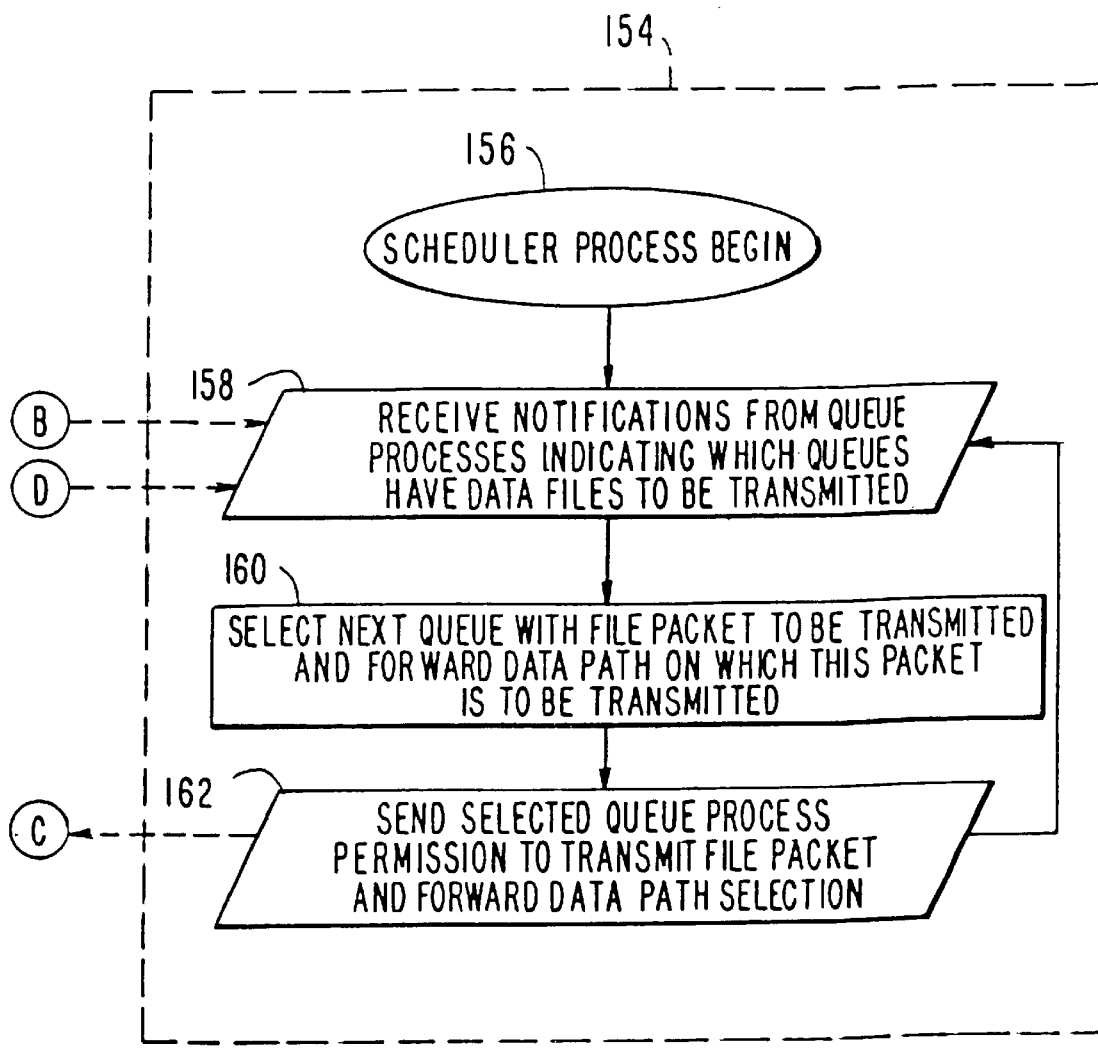
FIG. 5 is a flow diagram representing the scheduler processing function of a transmission system computer in accordance with the present invention.

An RPC server process 108, a queue process 128, and a scheduler process 154 that could be performed in RPC server 88 (FIG. 2), queues 96, 98, 100, 102, and 104 (FIG. 2), and scheduler 106 (FIG. 2), respectively, and that are in accordance with the present invention, are illustrated in FIGS. 3, 4, and 5, respectively.

As shown in FIG. 3, after RPC server process 108 has begun at step 110, RPC server 88 (FIG. 2) waits for and receives an RPC request 87 (FIG. 2) to transmit a data file at step 114. Once an RPC request 87 (FIG. 2) has been received at step 114, RPC server 88 (FIG. 2) determines whether RPC request 87 (FIG. 2) is a retransmission request at step 116. If RPC request 87 (FIG. 2) is determined to be a retransmission request at step 116, then the corresponding file header packet 94 (FIG. 2) is retrieved from file header description collection area 92 (FIG. 2) at step 118 and then transferred to the appropriate queue process 128 (FIG. 3) running in queue 96, 98, 100, 102, or 104 (FIG. 2) at step 126 based upon the priority indicated in file header packet 94 (FIG. 2) and the size of the data file. After file header packet 94 (FIG. 2) has been transferred, RPC server process 108 loops back to step 114 to wait for another RPC request 94 (FIG. 2).

If RPC request 87 (FIG. 2) is determined not to be a retransmission request at step 116, then RPC server process 108 determines at step 120 whether a copy flag is set in RPC request 87 (FIG. 2) for the associated data file. If a copy flag is determined to be set at step 120, then the data file is copied into archive storage device 90 (FIG. 2) at step 122. If a copy flag is determined not to be set at step 120 or once the data file has been copied at step 122, a file header packet 94 (FIG. 2) for the data file is constructed at step 124. Once file header packet 94 (FIG. 2) has been constructed at step 124, file header packet 94 (FIG. 2) is transferred to the appropriate queue process 128 (FIG. 3) running in queue 96, 98, 100, 102, or 104 (FIG. 2) at step 126 preferably based upon the priority indicated in file header packet 94 (FIG. 2) and the size of the data file. After file header packet 94 (FIG. 2) has been transferred, RPC server process 108 loops back to step 114 to wait for another RPC request 94 (FIG. 2).

As shown in FIG. 4, after queue process 128 has begun at step 130, queue process 128 waits for and receives a file header packet 94 (FIG. 2) from step 126 of RPC server process 108 (FIG. 3). If RPC server process 108 (FIG. 3) is transmitting file header packets 94 (FIG. 2) faster than queue processes 128 can process the received header packets 94 (FIG. 2), there may be a backlog of file header packets 94 (FIG. 2) that queue process 128 does not have to wait for at step 132. Once file header packet 94 (FIG. 2) has been received, queue process 128 notifies step 158 of scheduler process 154 (FIG. 5) that a data file is waiting to be transmitted at step 136. Queue process 128 then waits for and receives transmission permission from step 162 of scheduler process 154 (FIG. 5). In granting permission to queue process 128, scheduler process 154 (FIG. 5) also indicates which forward data path 22 (FIG. 1) the queue 96, 98, 100, 102, or 104 may transmit on. Once transmission permission has been received, a file header packet 94 or a file data packet 95 (FIG. 2) is retrieved or constructed (if necessary) at step 139. This packet is then transmitted at step 140.

After each packet has been transmitted, queue process 128 determines whether there are any more data packets 95 (FIG. 2) to be transmitted for the data file being transmitted at step 144. If there are more data packets 95 (FIG. 2) to be transmitted, queue process 128 loops back to step 138 to wait for permission to transmit again. Otherwise, if there are no more data packets 95 (FIG. 2) to be transmitted for the data file, queue process 128 then notifies step 158 of scheduler process 154 (FIG. 5) that no more data is waiting to be transmitted from the queue at step 147. Queue process 128 then determines at step 148 whether a resend flag is set in the file header packet 94 (FIG. 2) associated with the data file being transmitted. If a reset flag is determined to be set at step 148, then file header packet 94 (FIG. 2) is copied to file header description collection area 92 (FIG. 2) at step 150. If a reset flag is determined not to be set at step 148 or once file header packet 94 (FIG. 2) has been copied at step 150, then file header packet 94 (FIG. 2) is removed from the queue 96, 98, 100, 102, or 104 from which file header packet 94 (FIG. 2) is being transmitted. Once file header packet 94 (FIG. 2) has been removed, queue process 128 loops back to step 132 to wait for another file header packet 94 (FIG. 2) to be received from step 126 of RPC server process 108 (FIG. 3).

As shown in FIG. 5, once scheduler process 154 has begun at step 156, scheduler process 154 receives notifications at step 158 that files are waiting to be transmitted from step 136 of queue process 128 (FIG. 4). Once scheduler process 154 receives a notification that a file is waiting to be transmitted at step 158, scheduler process 154 selects the next queue 96, 98, 100, 102, or 104 (FIG. 2) at step 160 from which a header packet 94 or a data packet 95 (FIG. 2) is to be transmitted. Scheduler process 154 also selects a forward data path 22 (FIG. 1) at step 160 on which the selected queue 96, 98, 100, 102, or 104 (FIG. 2) will transmit its header packet 94 or data packet 95 (FIG. 2). Preferably, when possible, scheduler process 154 selects the forward data path 22 (FIG. 1) on which the selected queue 96, 98, 100, 102, or 104 is to transmit data in order to ensure that multiple forward data paths 22 (FIG. 1) are used to transmit header packets 94 and data packets 95 (FIG. 2) from each of queues 96, 98, 100, 102, and 104. Scheduler process 154 then sends at step 162 permission to transmit and the forward data path 22 (FIG. 1) selection to step 138 of queue process 128 (FIG. 4). Once permission has been given, scheduler process 154 loops back to step 158 to receive notifications indicating which queues 96, 98, 100, 102, and 104 (FIG. 2) have data files that are waiting to be transmitted.

Figure 6:
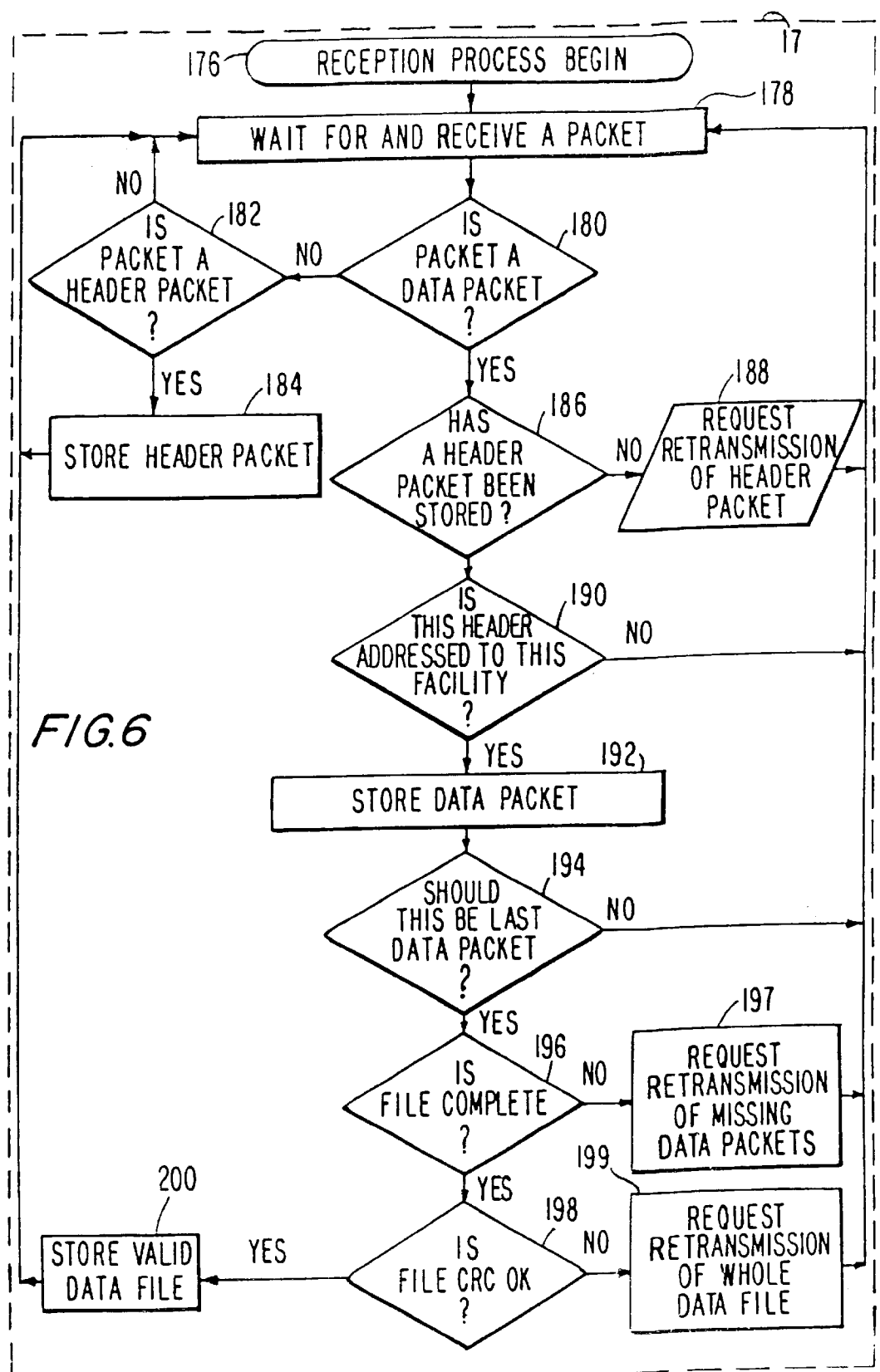
FIG. 6 is a flow diagram representing the reception processing function of a reception computer in accordance with the present invention.

A reception process 174 for receiving data files at data reception facility 24 is shown in FIG. 6. It should be noted that multiple instances of this process could be running in each data reception facility 24 at any given time to receive multiple data file transmissions. Once reception process 174 has begun at step 176, reception process 174 waits for and receives a file packet at step 178. At step 180, process 174 then determines whether this packet is a data packet 95 (FIG. 2) at step 180. If the packet is determined not to be a data packet 95 (FIG. 2) at step 180, then process 174 determines whether the packet is a header packet 94 (FIG. 2) at step 182. If the packet is determined to be a header packet 94 (FIG. 2) at step 182, then the packet is stored at step 184, otherwise process 174 returns to step 178 to wait for and receive another file packet.

If at step 180, however, the received packet is determined to be a data packet 95 (FIG. 2), then process 174 determines whether a header packet 94 (FIG. 2) that is associated with this data packet 95 (FIG. 2) has been stored at step 186. If a header packet 94 (FIG. 2) has not been stored, process 174 generates an RPC request 87 (FIG. 2) for retransmission of the missing header packet 94 (FIG. 2) at step 188 and loops back to step 178 to wait for and receive another packet. If a header packet 94 (FIG. 2) has been determined to be stored at step 186, then process 174 determines, at step 190, whether the stored header packet 94 (FIG. 2) is addressed to the data reception facility 24 (FIG. 1) in which this reception process 174 is being executed. If the stored header packet is not addressed to this facility 24 (FIG. 1), then process 174 loops back to step 178 to wait for and receive another packet.

If at step 190, however, the stored header packet 94 (FIG. 2) is determined to be addressed to this facility 24 (FIG. 1), then process 174 stores the data packet 95 (FIG. 2) at step 192. Once the data packet 95 (FIG. 2) has been stored, process 174 determines whether this data packet 95 (FIG. 2) should have been the last data packet 95 (FIG. 2) at step 194. If other data packets 95 (FIG. 2) are expected, then process 174 loops back to step 178 to wait for and receive another packet. If no other data packets 95 (FIG. 2) are expected, then process 174 determines whether the data file is complete from the received data packets 95 (FIG. 2) at step 196. If the data file is not complete from the received data packets 95 (FIG. 2), process 174 generates an RPC request 87 (FIG. 2) for retransmission of any missing data packets 95 (FIG. 2) at step 197. If the data file is determined to be complete at step 196, then the data file is checked for errors at step 198. If the data file is determined to contain errors at step 198, then process 174 requests retransmission of the whole data file at step 199 and loops back to step 178 to wait for and receive another packet. If, however, the file is found to be error free at step 198, then process 174 stores the data file as a valid file. Once a valid data file has been stored, process 174 returns to step 178 to receive other packets.

An illustrative cable data distribution system 11 in accordance with the present invention is shown in FIG. 7. Cable data distribution system 11 may be used to transmit data from a central facility to cable subscribers' homes. The data may include: software for execution on a set-top box, video cassette recorder, television, home computer, video game or other suitable device; interactive program guide data such as television program titles, schedules, detailed information, etc.; continuously updated sports information such as game scores, statistics, etc.; weather information such as storm alerts and national and local forecasts; news information such as news wire feeds, stock quotes, etc.; video and audio clips; graphic files for advertisements, etc.; diagnostic, configuration, reboot, and emergency data; or any other suitable data. As shown, system 11 has a data transmission facility 20, a satellite transmitter 40, a satellite transponder 42, a plurality of satellite receivers 44, a plurality of cable headend data reception facilities 24, a plurality of cable networks 168, a plurality of set-top boxes 166, and a plurality of televisions 170.

Similarly to its description above in connection with FIG. 1, data transmission facility 20 is used in system 11 to control the distribution of data to each of data reception facilities 24. Data transmission facility 20 may contain storage for all of the data distributed throughout system 11, or some or all of the data may be provided to data transmission facility 20 through a data input 167 connected to data network 32 (FIG. 1) of data transmission facility 20.

Once data has been prepared for transmission by data transmission facility 20 as described above in connection with FIGS. 1–5, the data is transmitted from satellite transmitter 40 through satellite transponder 42 to satellite receivers 44. The data received at satellite receivers 44 is then transferred to each cable headend data reception facility 24. Each cable headend data reception facility 24 then reconstructs the data file, requesting, through telephone lines 49, retransmission of any header packets 94 or data packets 95 (FIG. 2) corrupted during transmission.

After the data file has been reconstructed, the data is transferred through cable networks 168 from each cable headend data reception facility 24 to set-top boxes 166 in the cable subscribers' homes. Set-top boxes 166 then receive the data file, store the data file, and use the data in a desired fashion. For example, in an implementation wherein system 11 is used to transmit interactive program guide data to subscribers' homes, set-top boxes 166 may receive and store the interactive program guide data, generate a presentation of the data, and cause the presentation to be displayed on televisions 170.

As illustrated in FIG. 8, the present invention may also be implemented in a system 12 that utilizes a direct broadcast of data from a satellite to subscribers' homes. In such a system 12, data, such as those types listed above in connection with FIG. 7, may be transmitted from a data transmission facility 20 through a satellite transponder 42 to a plurality of satellite receivers 44. As also described above, this data may be stored locally in data transmission facility 20 or may be provided to data transmission facility 20 through a data input 167 connected to data network 32 (FIG. 1) of data transmission facility 20. The header packets 94 and data packets 95 (FIG. 2) received at satellite receivers 44 may then be transferred to the data reception facilities in set-top boxes 172. The data reception facilities in set-top boxes 172 may then reconstruct the data files from packets 94 and 95 (FIG. 2), requesting retransmission of any corrupted packets 94 or 95 (FIG. 2) through telephone lines 49. Once the data file has been reconstructed, the set-top boxes 172 may store the data file and use the data in a desired fashion. For example, an interactive program guide, as described in connection with FIG. 7, may be presented on televisions 170.

To further integrate and automate the way in which data files are verified and used once received at a data reception facility 24 (FIG. 1), a manifest process 202 is provided as illustrated in FIG. 9. This manifest process 202 executes at both the data transmission facility 20 (FIG. 1), particularly in primary computer 34 or backup computer 36 (FIG. 1), and the data reception facilities 24 (FIG. 1). Once manifest process 202 has begun at step 204, step 206 of manifest process 202 constructs, at data transmission facility 20 (FIG. 1), a manifest that lists information regarding data files for which RPC requests 87 (FIG. 2) have been received. This manifest may include information such as the file name, a file date and time, a 32-bit CRC code, one or more command to be executed, etc., for each requested data file. The manifest is then transmitted at step 208 from data transmission facility 20 (FIG. 1) and received at step 210 at data reception facility 24 (FIG. 1). After being received, the information in the manifest is used at step 212 to verify the presence, identity, and integrity of all of the files for which information is included in the manifest. For example, in addition to verifying the name, date, and time of each file in the manifest, the manifest process may use the CRC code to verify that the contents of the data file received match that of the data file that was supposed to be transmitted. At step 214, manifest process 202 then determines whether any files in the manifest are missing or corrupt. If it is determined that one or more files are missing or corrupt at step 214, manifest process 202 generates at step 216 one or more RPC requests 87 (FIG. 2) that are sent from data reception facility 24 (FIG. 1) to data transmission facility 20 (FIG. 1) to request retransmission of the one or more missing or corrupt data files. Manifest process 202 then waits at step 218 for replacement files to be received for the one or more missing or corrupt data files. After the replacement files have been received, manifest process 202 returns to step 212 to verify the presence, identity, and integrity of the data files on the manifest. If it is determined, however, at step 214 that no files are missing or corrupt, then manifest process 202 performs the one or more commands for each data file. These commands could include basic file command such as move, copy, delete, rename, and execute, as well as process specific or signaling commands. For example, a signaling command could be used in a system 12 as illustrated in FIG. 7 to signal a weather process running in set-top box 172 that new data has been received, and that this data should be read and displayed to on television 170. When all of the processing of the commands has been completed, manifest process 202 completes at step 222.

It will be understood that the foregoing is only illustrative of the principles of the invention and that various modifications can be made by those skilled in the art without departing from the scope and spirit of the invention, which is limited only by the claims that follow.

What is claimed is:

1. A method of requesting retransmission of replacement data to replace original data from a data transmission facility at a plurality of data reception facilities, the method comprising:

receiving at least a portion of the original data from the data transmission facility at each data reception facility of the plurality of the data reception facilities;

detecting an error condition based upon a characteristic of said at least a portion of the original data at each data reception facility of the plurality of the data reception facilities;

transmitting to the data transmission facility a request for transmission of replacement data from each data reception facility of the plurality of the data reception facilities;

coordinating the request for transmission of replacement data from each data reception facility of the plurality of the data reception facilities so that similar requests for replacement data are identified; and transmitting once replacement data from the data transmission facility to each data reception facility of the plurality of data reception facilities that transmitted to the data transmission facility similar requests for replacement data.

2. The method defined in claim 1 wherein:

receiving at least a portion of the original data comprises receiving at least a portion of the original data from the data transmission facility over a first data path; and transmitting to the data transmission facility a request for transmission of the replacement data comprises transmitting to the data transmission facility from each data reception facility of the plurality of the data reception facilities over a second data path a request for transmission of the replacement data.

3. The method defined in claim 2 wherein the first and second data paths are of different types.

4. The method defined in claim 2 wherein the first and second data paths are Internet links.

5. The method defined in claim 1 wherein the original data and the replacement data are interactive television program guide data.

6. The method defined in claim 1 wherein the request for transmission of the replacement data is a remote procedure call.

7. The method defined in claim 1 wherein transmitting to the data transmission facility a request for transmission of the replacement data from each data reception facility comprises delaying the request for transmission of the replacement data at each data reception facility of the plurality of the data reception facilities by a random period of time.

8. A method for use in an interactive television program guide system of requesting retransmission of replacement interactive television program guide data to replace original interactive television program guide data from a data transmission facility at a plurality of headends, the method comprising:

receiving at least a portion of the original interactive television program guide data from the data transmission facility at each headend of the plurality of headends;

detecting an error condition based upon a characteristic of said at least a portion of the original interactive television program guide data at each headend of the plurality of headends;

transmitting to the data transmission facility a request for transmission of replacement interactive television program guide data from each headend of the plurality of headends;

coordinating the request for transmission of replacement interactive television program guide data from each headend of the plurality of headends so that similar requests for replacement data are identified; and transmitting once replacement interactive television program guide data from the data transmission facility to each headend of the plurality of headends that transmitted to the data transmission facility similar requests for replacement data.

9. A method for retransmitting data to a plurality of data reception facilities, the method comprising:

receiving data from a data transmission facility at each data reception facility of the plurality of data reception facilities;

transmitting from each data reception facility of the plurality of data reception facilities to the data transmission facility a request for retransmission of a portion of the data, wherein the portion of the data has an error condition;

receiving each request at the data transmission facility;

detecting at the data transmission facility similar requests for retransmission of a given portion of data from multiple data reception facilities of the plurality of data reception facilities; and retransmitting, in a single transmission, the given portion of data from the data transmission facility to all data reception facilities requesting retransmission of the given portion of the data.

10. The method defined in claim 9 wherein the original data and the replacement data are interactive television program guide data.

11. A method of requesting retransmission of replacement data to replace original data from a data transmission facility at a plurality of data reception facilities, the method comprising:

receiving at least a portion of the original data from the data transmission facility at at least one data reception facility of the plurality of the data reception facilities;

detecting an error condition based upon a characteristic of said at least a portion of the original data at each of said at least one data reception facility of the plurality of the data reception facilities;

transmitting to the data transmission facility a request for transmission of replacement data from each of said at least one data reception facility of the plurality of the data reception facilities;

coordinating the request for transmission of replacement data from each of said at least one data reception facility of the plurality of the data reception facilities so that similar requests for replacement data are identified; and transmitting once replacement data from the data transmission facility to each of said at least one data reception facility of the plurality of data reception facilities that transmitted to the data transmission facility similar requests for replacement data.

12. The method defined in claim 11 wherein the original data and the replacement data are interactive television program guide data.

* * * * *

UNITED STATES PATENT AND TRADEMARK OFFICE
CERTIFICATE OF CORRECTION

PATENT NO. : 6,449,654 B1
DATED : September 10, 2002
INVENTOR(S) : Bruce A. Blackwell et al.

It is certified that error appears in the above-identified patent and that said Letters Patent is hereby corrected as shown below:

Title page, Item [54], and Column 1, line 1,
Change "SYSTEM" to -- SYSTEMS --.
Item [56], References Cited, FOREIGN PATENT DOCUMENTS, change "0 753 817 A1" to -- EP 0 753 817 A1 --.

Drawings,
Sheet 3, FIG. 3, change "RETRANMISSION" to -- RETRANSMISSION --.
Sheet 4, FIG. 4, change "DESCRIPITON" to -- DESCRIPTION --.

Column 3,
Line 38, change "thirty one" to -- thirty-one --.

Column 4,
Line 59, change "One" to -- Once --.

Column 5,
Line 28, change "included" to -- include --.
Line 65, change "20" to -- 30 --.

Column 6,
Line 52, change "copy the" to -- copy of the --.
Line 52, change "data reception facility will" to -- data reception facility 24 will --.

Column 8,
Line 9, change "indicated" to -- indicate --.
Line 45, change "packets 95 as being" to -- packets 95 are being --.

Column 9,
Line 11, change "identitication" to -- identification --.

UNITED STATES PATENT AND TRADEMARK OFFICE
CERTIFICATE OF CORRECTION

PATENT NO. : 6,449,654 B1
DATED : September 10, 2002
INVENTOR(S) : Bruce A. Blackwell et al.

It is certified that error appears in the above-identified patent and that said Letters Patent is hereby corrected as shown below:

Column 11,
Line 24, change "may indicated" to -- may indicate --.

Column 16,
Line 27, change "displayed to on television" to -- displayed on television --.

Signed and Sealed this

First Day of April, 2003

JAMES E. ROGAN
*Director of the United States Patent and Trademark Office*